(12) United States Patent
Brown et al.

(10) Patent No.: US 10,899,256 B2
(45) Date of Patent: Jan. 26, 2021

(54) SEAT ASSEMBLIES FOR TEMPORARILY ATTACHING A SEAT ASSEMBLY TO A VEHICLE

(71) Applicant: Toyota Motor Engineering & Manufacturing North America, Inc., Plano, TX (US)

(72) Inventors: Shelby L. Brown, Brighton, MI (US); Edward Qiu, Forest Hills, NY (US); Patrick J. Edgar, Ann Arbor, MI (US); Jacob C. Herget, Ypsilanti, MI (US); Vikas Bhatia, South Lyon, MI (US); Robert Jones, Lexington, KY (US); John Salvia, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/449,798

(22) Filed: Jun. 24, 2019

(65) Prior Publication Data

US 2020/0398717 A1    Dec. 24, 2020

(51) Int. Cl.
    *B60N 2/30*     (2006.01)
    *B60N 2/36*     (2006.01)
    *B60N 2/68*     (2006.01)
    *B60N 2/015*    (2006.01)

(52) U.S. Cl.
    CPC ............ *B60N 2/682* (2013.01); *B60N 2/015* (2013.01); *B60N 2/3011* (2013.01); *B60N 2205/30* (2013.01)

(58) Field of Classification Search
    CPC ...... B60N 2/015; B60N 2/682; B60N 2/3011; B60N 2205/30
    USPC .............................. 297/331, 335, 337, 463.1
    See application file for complete search history.

(56) References Cited

U.S. PATENT DOCUMENTS

| | | | | |
|---|---|---|---|---|
| 4,793,649 A | * | 12/1988 | Yamano | ............... B60N 2/3072 296/65.09 |
| 5,800,015 A | * | 9/1998 | Tsuchiya | .............. B60N 2/0715 297/331 X |
| 6,149,237 A | | 11/2000 | Morishita et al. | |

(Continued)

FOREIGN PATENT DOCUMENTS

| | | |
|---|---|---|
| JP | H1178637 A | 3/1999 |
| JP | 2004299624 A | 10/2004 |

(Continued)

*Primary Examiner* — Rodney B White
(74) *Attorney, Agent, or Firm* — Dinsmore & Shohl LLP (57) ABSTRACT

A seat assembly, for a vehicle having a frame member, includes a seat back, a seat cushion, and a seat bracket. The frame member extends along a floor of the vehicle and includes a bore. The seat cushion is pivotally coupled to the seat back for movement between a use position and a raised position. The seat bracket is coupled to at least one of the seat back and the seat cushion. The seat bracket includes a pin that extends downwardly in a vehicle vertical direction. The pin engages with the bore to temporarily attach the seat cushion and the seat back to the frame member on the floor of the vehicle and inhibit a rotation of the seat assembly in a vehicle forward direction when the seat cushion is in the raised position due to the engagement of the pin extending through the bore of the frame member.

20 Claims, 4 Drawing Sheets

(56) References Cited

U.S. PATENT DOCUMENTS

| | | | |
|---|---|---|---|
| 6,883,868 B2* | 4/2005 | Yoshida | B60N 2/065 297/331 |
| 7,374,242 B2* | 5/2008 | Champ | B60N 2/3031 297/331 X |
| 7,712,829 B2* | 5/2010 | Park | B60N 2/01 296/65.13 |
| 7,780,234 B2* | 8/2010 | Grable | B60N 2/305 297/331 X |
| 8,376,442 B1* | 2/2013 | Brantley | B60N 2/24 297/337 X |
| 9,623,775 B2* | 4/2017 | Kanai | B60N 2/06 |
| 9,987,954 B2 | 6/2018 | Kimata | |
| 2004/0212237 A1* | 10/2004 | Epaud | B60N 2/065 297/331 |
| 2009/0295185 A1 | 12/2009 | Abe et al. | |
| 2010/0270839 A1* | 10/2010 | Moegling | B60N 2/02 297/335 X |
| 2010/0289313 A1* | 11/2010 | Moegling | B60N 2/309 297/335 X |
| 2011/0241401 A1* | 10/2011 | Otsuka | B60N 2/3013 297/331 |

FOREIGN PATENT DOCUMENTS

| | | |
|---|---|---|
| JP | 2005324565 A | 11/2005 |
| JP | 4234146 B2 | 3/2009 |
| JP | 4263628 B2 | 5/2009 |
| JP | 2013095272 A | 5/2013 |

* cited by examiner

SEAT ASSEMBLIES FOR TEMPORARILY ATTACHING A SEAT ASSEMBLY TO A VEHICLE

TECHNICAL FIELD

The present specification generally relates to seat assemblies for a vehicle, and more particularly, seat assemblies that temporarily attach the seat assemblies to the vehicles while preventing forward rotation of the seat assemblies prior to installation.

BACKGROUND

Vehicles including seats that have pivotable seat cushions, generally referred to as tip up seat cushions, are customarily installed with the seat cushion pivoted to the tipped up position to accommodate insertion of the seat through a door opening and into the passenger compartment. However, a center of gravity of the seat when in the tipped up position is rearward of a seat attachment point in the vehicle which prevents a forward rotation of the seat during installation of the seat. Seat assemblies that position a center of gravity of the seat forward of the seat attachment point in the vehicle are naturally inclined to rotate forward, thereby requiring an operator to restrain against the forward rotation of the seat assembly during installation which requires increased assembly time, labor, and costs.

Accordingly, a need exists for alternative seat assemblies for preventing a forward rotation of a seat having a tip up seat cushion with a center of gravity positioned forward of a seat attachment point of a vehicle.

SUMMARY

In one embodiment, a seat assembly for a vehicle having a frame member, includes a seat back, a seat cushion, and a seat bracket. The frame member extends along a floor of the vehicle and includes a bore. The seat cushion is pivotally coupled to the seat back for movement between a use position and a raised position. The seat bracket is coupled to at least one of the seat back and the seat cushion. The seat bracket includes a pin that extends downwardly in a vehicle vertical direction. The pin is configured to engage with the bore to temporarily attach the seat cushion and the seat back to the frame member on the floor of the vehicle and inhibit a rotation of the seat assembly in a vehicle forward direction when the seat cushion is in the raised position due to the engagement of the pin extending through the bore of the frame member.

In another embodiment, a vehicle includes a seat assembly and a frame member. The seat assembly includes a seat back, a seat cushion, and a seat bracket. The seat cushion is pivotable relative to the seat back between a use position to a raised position. The seat bracket includes a pin that extends downwardly in a vehicle vertical direction from the seat bracket. The frame member extends along a floor of the vehicle. The frame member includes a bore. The pin is configured to engage with the bore to temporarily attach the seat assembly to the frame member on the floor of the vehicle and inhibit a rotation of the seat assembly in a vehicle forward direction when the seat cushion is in the raised position due to the engagement of the pin extending through the bore of the frame member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Seat assemblies and vehicles including seat assemblies are disclosed herein. In one embodiment, the vehicle includes a frame member and the seat assembly. The frame member extends along a floor of the vehicle and includes a bore. The seat assembly includes a seat back, a seat cushion, and a seat bracket. The seat cushion is pivotally coupled to the seat back for movement between a use position and a raised position. The seat bracket is coupled to at least one of the seat back and the seat cushion. The seat bracket includes a pin that extends downwardly in a vehicle vertical direction. The pin is configured to engage with the bore to temporarily attach the seat cushion and the seat back to the frame member on the floor of the vehicle and inhibit a rotation of the seat assembly in a vehicle forward direction when the seat cushion is in the raised position due to the engagement of the pin extending through the bore of the frame member As used herein, the term "vehicle longitudinal direction" refers to the forward-rearward direction of the vehicle (i.e., in the +/− vehicle X-direction as depicted). The term "vehicle lateral direction" refers to the cross-vehicle direction of the vehicle (i.e., in the +/− vehicle Z-direction as depicted), and is transverse to the vehicle longitudinal direction. The term "vehicle vertical direction" refers to the upward-downward direction of the vehicle (i.e., in the +/− vehicle Y-direction as depicted). Further, the terms "upward," "downward," "rearward" and "forward" are used to describe the relative positioning of various components of the vehicle relative to one another. Because the vehicle may be generally symmetrical about a vehicle centerline, the terms "upward," "downward," "rearward" and "forward" may be switched when evaluating components positioned along opposite sides of the vehicle. Further, while certain components of the vehicle are described as extending in one of the identified directions or oriented toward one of the identified directions, it should be understood that these components extend or are oriented in at least these recited directions.

Figure 1:
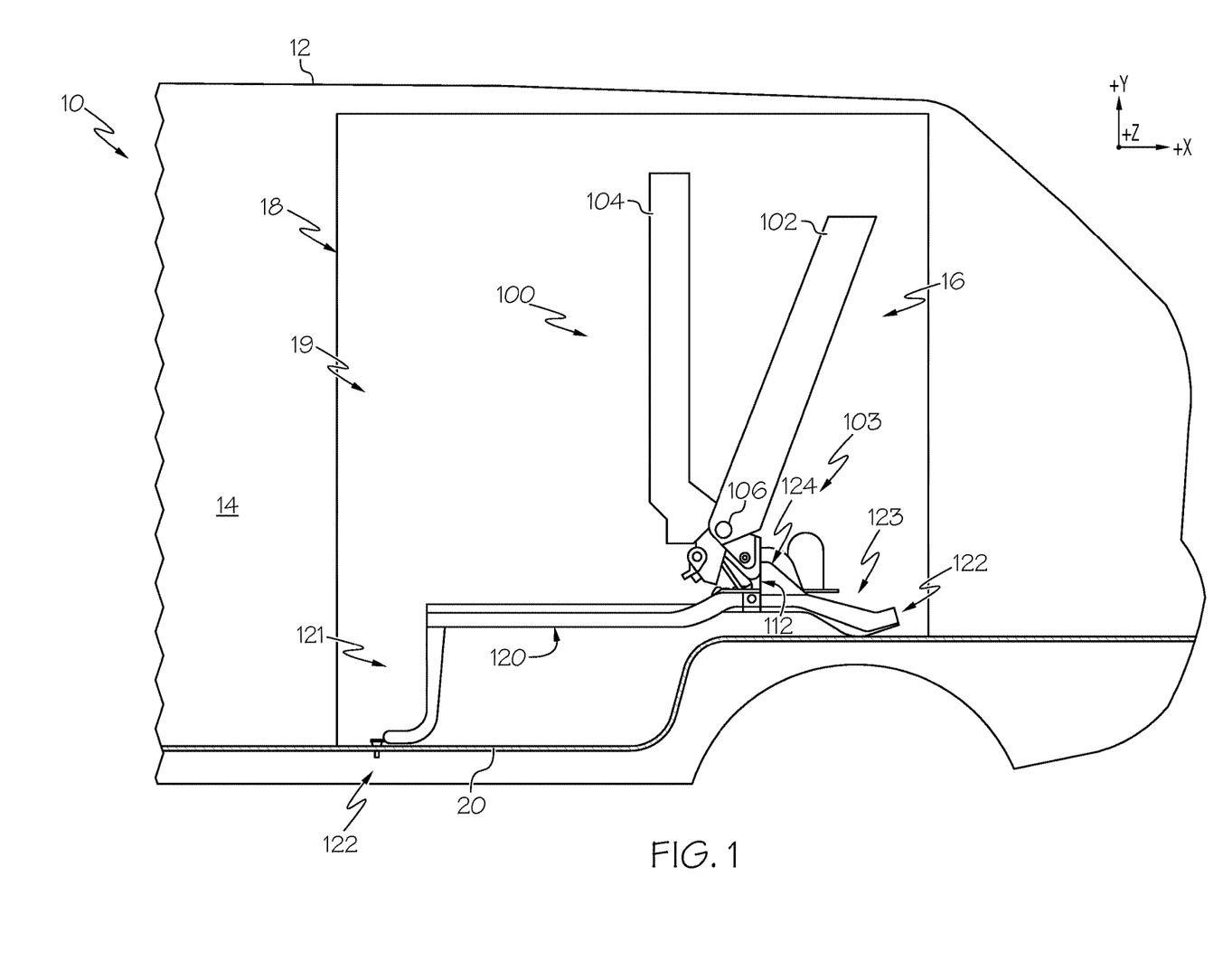
FIG. 1 schematically depicts a partial side view of a vehicle having a seat assembly attached to an attachment point, according to one or more embodiments shown or described herein.

Referring now to FIG. 1, a seat assembly 100 is generally depicted. In some embodiments, the seat assembly 100 is provided within a vehicle 10. In some embodiments, the vehicle 10 is a truck. In some embodiments, the vehicle 10 may be a car, a sport utility vehicle, a van, a boat, a plane, or other vehicle types. The vehicle 10 includes a body 12 onto which a vehicle drivetrain is coupled. The vehicle 10 includes a cabin 14 that is integral with the body 12. The cabin 14 generally defines a passenger compartment of the vehicle 10 and includes one or more seat rows 16 positioned therein for seating occupants within the vehicle 10. In the present example, the seat row 16 is a rear seat row of the cabin 14 that is positioned in the vehicle longitudinal direction (i.e. in the +/−X direction of the coordinate axes shown in the figures) relatively behind a front seat row (not shown). The vehicle 10 further includes one or more door assemblies 18 defining a door opening 19. In the present example, the door assembly 18 facilitates access to the cabin 14, and in particular to the rear seat row 16 of the cabin 14 depicted in FIG. 1.

The body 12 of the vehicle 10 may further include a floor 20 extending in the vehicle longitudinal direction (i.e. in the +/−X direction of the coordinate axes shown in the figures) such that the floor 20 partially defines the cabin 14 of the vehicle 10. The floor 20 may define a portion of the rear seat row 16 of the cabin 14. In some embodiments, the cabin 14 of the vehicle 10 may include one or more frame members 120 disposed therein. In particular, the rear seat row 16 of the cabin 14 includes at least one frame member 120 (i.e. floor member) coupled to the floor 20 of the vehicle 10. In this instance, the frame member 120 is coupled to the body 12 of the vehicle 10 and is configured to couple the seat assembly 100 to the body 12 of the vehicle 10. It should be understood that in other embodiments additional seat rows of the cabin 14 may include one or more frame members 120 secured therein.

Still referring to FIG. 1, the frame member 120 may include one or more attachment points for securely fastening the frame member 120 to the body 12 of the vehicle 10. In particular, in some embodiments the one or more attachment points of the frame member 120 includes a flange 122 extending outwardly from the frame member 120 and configured to securely fix the frame member 120 to the body 12 of the vehicle 10. In the present example, the frame member 120 includes a front region 121 and a rear region 123, where the front region 121 is positioned relatively opposite of the rear region 123 of the frame member 120. The front region 121 and/or the rear region 123 may include one or more flanges 122 extending outwardly therefrom. The one or more flanges 122 are configured to be secured to body 12 of the vehicle 10 to securely couple the frame member 120 to the body 12 of the vehicle 10. In the present example, the one or more flanges 122 extending outwardly from the frame member 120 along the front region 121 extend in the vehicle vertical direction (i.e. in the +\−Y direction of the coordinate axes of the figures) and the one or more flanges 122 extending outwardly from the frame member 120 along the rear region 123 extend in the vehicle longitudinal direction (i.e. in the +\−X direction of the coordinate axes of the figures).

The flanges 122 of the frame member 120 may be integrally molded with the frame member 120 such that the flanges 122 and the frame member 120 are a unitary structure. In other embodiments, the flanges 122 may be separate components assembled to the frame member 120 along the front region 121, the rear region 123, and/or various other regions of the frame member 120. In some embodiments, the frame member 120 may be securely fixed to the body 12 of the vehicle 10 by one or more fasteners. In other embodiments, the flanges 122 may be securely fixed to the body 12 of the vehicle 10 by one or more fasteners. It is appreciated, that the frame member 120 and the flanges 122 may be securely fixed to the body 12 of the vehicle 10 through welding, adhesive, and/or rivets. It is also appreciated, that the frame member 120 and the flanges 122 may be integrally molded with the body 12 of the vehicle 10 such that the frame member 120 and the flanges 122 are a unitary structure with the body 12 of the vehicle 10.

Figure 3:
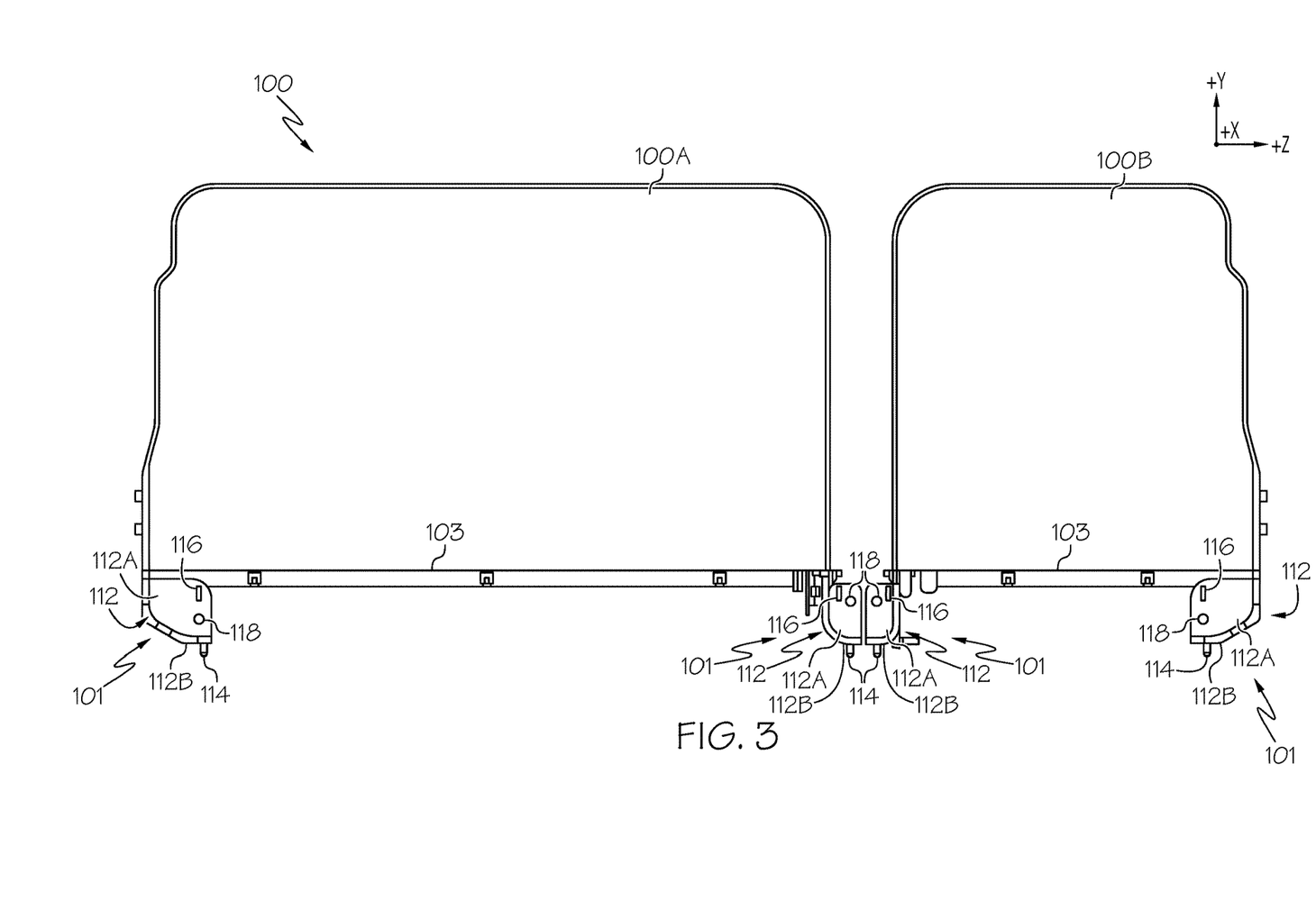
FIG. 3 schematically depicts a partial rear view of the seat assembly of FIG. 1 including seat brackets with pins extending therefrom, according to one or more embodiments shown and described herein.

Referring to FIGS. 1 and 3, the seat assembly 100 is configured as a rear 60/40 seat that includes a first seat assembly 100A and a second seat assembly 100B. The seat assembly 100 is configured to support three occupants above the floor 20 of the vehicle 10. Specifically, the first seat assembly 100A is configured as the "60" seat to support an occupant on an outer portion of the first seat assembly 100A, in the vehicle lateral direction, and an occupant on an inner portion of the first seat assembly 100A, in the vehicle lateral direction. The second seat assembly 100B is configured as the "40" seat to support a single occupant. It is appreciated that the seat assembly 100 is not limited to the "60/40" seat. Specifically, the seat assembly 100 is optionally provided in a "50/50" seat, a captain type seat, a bucket type seat, or other various seat assemblies. As the second seat assembly 100B is substantially similar to the first seat assembly 100A, description of the first seat assembly 100A, hereinafter referred to as seat assembly 100, will be provided.

The seat assembly 100 includes a seat back 102 and a seat cushion 104 that is pivotally coupled to the seat back 102 about a pivot axis 106. The pivot axis 106 may comprise various mechanical components configured to facilitate a pivotable coupling of the seat cushion 104 to the seat back 102. For example, in some embodiments the pivot axis 106 may comprise a hinge, a pivot bolt, a rotatable fastening nut, and/or the like. The seat cushion 104 is configured to transition between a use position and a raised position. In the use position, the seat assembly 100 is operable to receive an occupant on the seat cushion 104. In the use position, the seat cushion 104 extends parallel to the vehicle longitudinal direction (i.e. in the +/−X direction of the coordinate axes shown in the figures). In the raised position, the seat assembly 100 is inoperable to receive an occupant on the seat cushion 104. In the raised position, the seat cushion 104 extends transverse to the vehicle longitudinal direction and substantially parallel to the vehicle vertical direction (i.e. in the +/−Y direction of the coordinate axes shown in the figures).

Referring to FIG. 1, the seat assembly 100 is depicted in the raised position in which the seat cushion 104 is pivoted about the pivot axis 106 toward the seat back 102, such that the seat assembly 100 is inoperable to receive an occupant along the seat cushion 104. In the raised position a center of gravity of the seat assembly 100 is positioned forward relative to the seat back 102 in the −X direction of the coordinate axes shown in the figures. Accordingly, prior to the seat assembly 100 being fixedly secured to the frame member 120, the seat assembly 100 is naturally inclined to rotate forward within the cabin 14 of the vehicle 10 in the −X direction of the coordinate axes shown in the figures due to a relative position of a center of gravity of the seat assembly 100. As described in greater detail below, the seat assembly 100 is configured to counter and inhibit a forward rotation of the seat assembly 100 prior to the seat assembly 100 being fixedly secured to the frame member 120.

Figure 2:
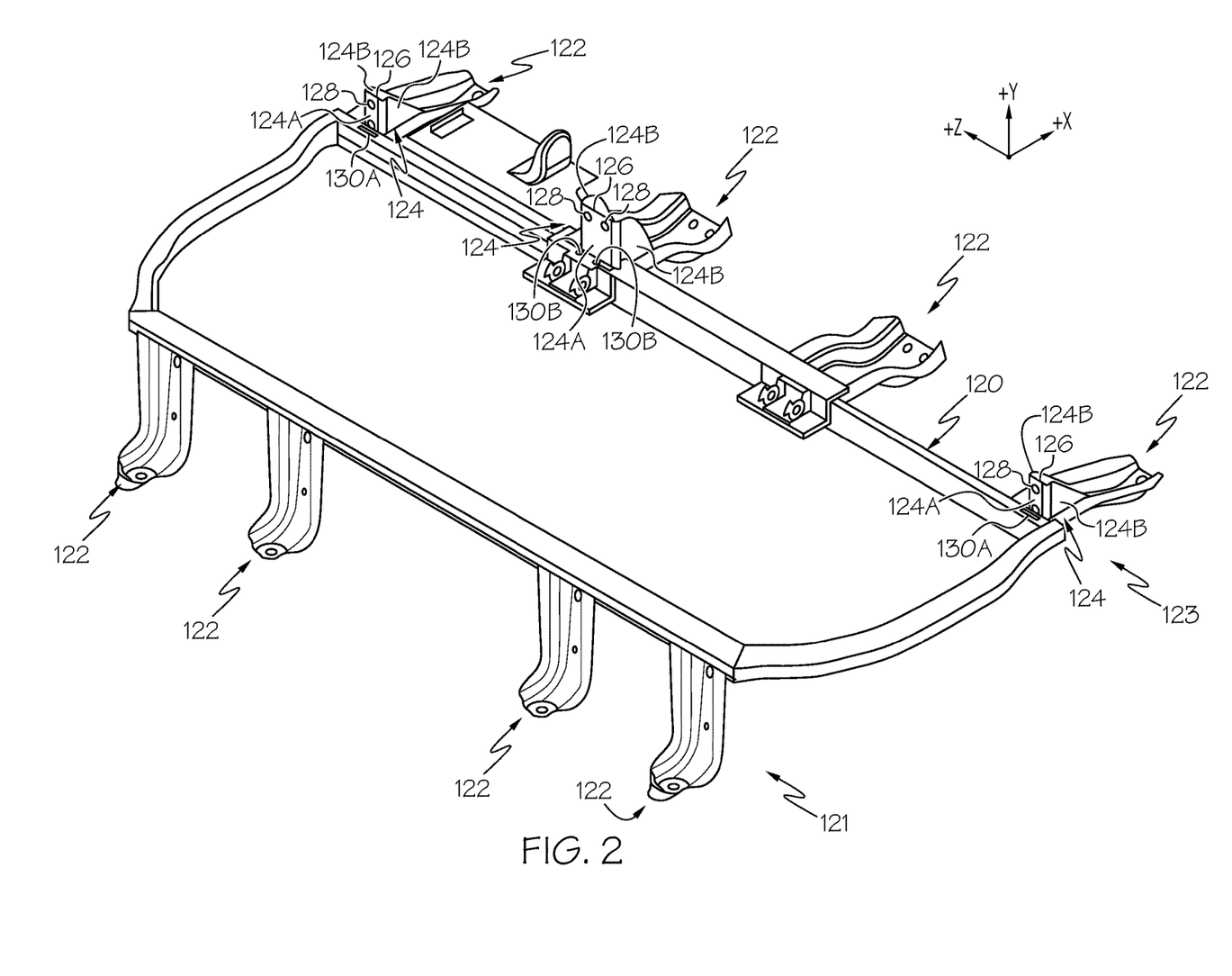
FIG. 2 schematically depicts a perspective view of a frame member of the vehicle, to which the seat assembly is attached to at the assembly point, of FIG. 1, according to one or more embodiments shown and described herein.

Referring to FIGS. 1 and 2, the frame member 120 further includes one or more frame brackets 124 extending outwardly from the frame member 120 in the vehicle vertical direction (i.e. in the +Y direction of the coordinate axes shown in the figures). In particular, the frame brackets 124 extend upwardly from the frame member 120 along the rear region 123 of the frame member 120 opposite of the front region 121. As described in greater detail below, the frame brackets 124 are an attachment point for securing the seat assembly 100 to the frame member 120.

In one embodiment, the frame brackets 124 of the frame member 120 are positioned in alignment with at least one or more of the flanges 122 along the rear region 123 of the frame member 120. Further, the frame bracket 124 may be formed integrally with the frame member 120 and/or the flanges 122 such that the frame bracket 124 are unitarily formed with the frame member 120. It should be understood that in other embodiments the frame bracket 124 may be assembled onto the frame member 120 and/or the flanges 122 as a separate component and/or the frame brackets 124 may be positioned in other relative alignments with the flanges 122.

The frame brackets 124 include a main wall 124A and a pair of sidewalls 124B that extend rearward from the main wall 124A such that the frame brackets 124 have a generally U-shaped cross-section. The main wall 124A defines a coupling interface of the frame bracket 124. The main wall 124A includes an upper edge 126 that extends in the vehicle lateral direction (i.e. in the +/−Z direction of the coordinate axes shown in the figures) when the frame member 120 is received in and coupled to the body 12 of the vehicle 10. It should be appreciated that the upper edge 126 of the main wall 124A may extend along other relative directions and/or comprise various other configurations than those shown and described herein without departing from the scope of the present disclosure. The frame brackets 124 of the frame member 120 may further include one or more apertures 128 on the main wall 124A that forms the coupling interface of the frame bracket 124. As described below, the apertures 128 are configured to facilitate a fixedly secure attachment of the frame member 120 to the seat assembly 100.

The frame member 120 further includes a pair of outer bores 130A and a pair of inner bores 130B. The pair of outer bores 130A is positioned adjacent outer sides of the frame member 120 in the vehicle lateral direction. The pair of inner bores 130B is positioned between the pair of outer bores 130A. The pair of outer bores 130A is positioned on the frame member 120 at a location corresponding to each of the pair of frame brackets 124 positioned adjacent outer sides of the frame member 120 in the vehicle lateral direction. In some embodiments, the pair of outer bores 130A include an elongated profile such that each of the pair of outer bores 130A are sized and shaped to include a lateral length in the +/−Z direction of the coordinate axes of the figures that is greater than a longitudinal length in the +/−X direction of the coordinate axes. In other words, each of the pair of outer bores 130A are an elongated slot that extend in a vehicle lateral direction (i.e. in the +/−Z direction of the coordinate axes of the figures).

The pair of inner bores 130B is positioned between the pair of outer bores 130A. In some embodiments, the pair of inner bores 130B includes a generally circular profile. In other embodiments the pair of outer bores 130A and the pair of inner bores 130B of the frame member 120 may include various other profiles and/or shapes without departing from the scope of the present disclosure. In some embodiments, additional and/or fewer bores 130A, 130B may be included along the rear region 123 of the frame member 120 than those shown and described herein.

Referring to FIG. 3, the seat assembly 100 includes one or more seat brackets 112 coupled to at least one of the seat back 102 and the seat cushion 104. In the present example, the seat assembly 100 includes a pair of seat brackets 112 coupled along terminal ends 101 of each of the seat backs 102. More particularly, the seat brackets 112 are positioned along a lower rear end 103 of the seat assembly 100. In some embodiments, the seat brackets 112 of the seat assembly 100 may be integrally molded with the seat assembly 100 while in other embodiments the seat brackets 112 may be separate components assembled to the seat backs 102 and/or the seat cushions 104 of the seat assembly 100.

Each of seat brackets 112 includes a base wall 112A and a lower wall 112B. The base wall 112A extends generally normal to the vehicle longitudinal direction. The lower wall 112B extends outwardly from the base wall 112A generally normal to the vehicle vertical direction. The seat brackets 112 defines a coupling interface of the seat assembly 100. Each of the seat brackets 112 of the seat assembly 100 includes a pin 114 that extends downwardly from the lower wall 112B in the vehicle vertical direction (i.e. in the +/−Y direction of the coordinate axes shown in the figures). In particular, the pin 114 extends from the seat bracket 112 in the −Y direction of the coordinate axes of the figures and is sized and shaped to be received within the one of the pair of outer bores 130A and the pair of inner bores 130B of the frame member 120.

In some embodiments, the pin 114 is integrally molded with the seat bracket 112 of the seat assembly 100 such that the pin 114 and the seat bracket 112 are a unitary structure. In embodiments, the pin 114 is a separate component that is manually assembled onto the seat bracket 112 prior to coupling the seat assembly 100 to the frame member 120. It should be understood that in other embodiments additional and/or fewer pins 114 may be included in each seat bracket 112 of the seat assembly 100.

Still referring to FIG. 3, each of the seat brackets 112 includes one or more hooks 116 positioned on a rear surface of the base wall 112A of the seat bracket 112. The hooks 116 extend outwardly from the rear surface of the base wall 112A. In the present example, the seat assembly 100 includes at least one hook 116 for each of the seat brackets 112 included thereon. In other embodiments, additional and/or fewer hooks 116 may be included on each of the seat brackets 112 of the seat assembly 100 than those shown and described herein without departing from the scope of the present disclosure. In some embodiments, the hooks 116 may be omitted entirely from the one or more seat brackets 112 of the seat assembly 100. Alternatively, each of the seat brackets 112 may include multiple hooks 116.

Figure 4:
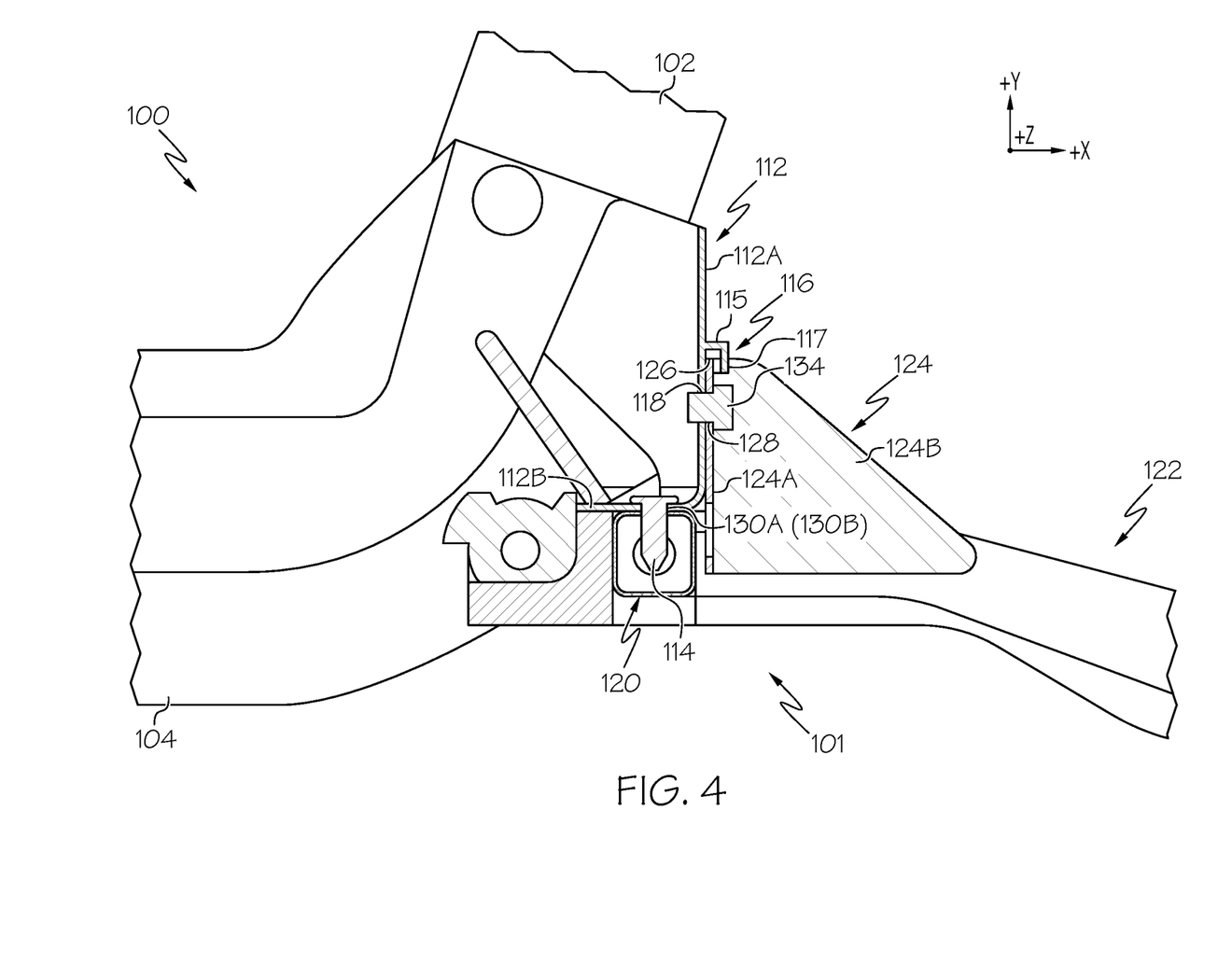
FIG. 4 depicts schematically depicts a partial cross-sectional view of the attachment point of the seat assembly of FIG. 1, according to one or more embodiments shown and described herein.

As best seen in FIG. 4, each of the hooks 116 includes a leg 115 and an arm 117 that define a generally L-shape of the hooks 116. The leg 115 extends rearward from a rear surface of the base wall 112A of the seat bracket 112 in a vehicle rearward direction (i.e. the vehicle longitudinal direction shown in the figures). The arm 117 extends downwardly from the leg 115 in the vehicle vertical direction. More specifically, the leg 115 extends rearwardly from the base wall 112A of the seat bracket 112 in the +X direction of the coordinate axes shown in the figures, and the arm 117 extends downwardly from the leg 115 in the −Y direction of the coordinate axes. In some embodiments, the arm 117 may extend from a terminal end of the leg 115, or the arm 117 may extend from a position forward of the terminal end of the leg 115 in the vehicle longitudinal direction. As described in greater detail below, the hook 116 defines a cavity between the leg 115, the arm 117, and the rear surface of the base wall 112A of the seat bracket 112, that is sized and shaped to receive the upper edge 126 of the frame bracket 124.

The seat bracket 112 of the seat assembly 100 further includes one or more apertures 118 formed in the base wall 112A of the seat bracket 112. The one or more apertures 118 of the seat bracket 112 are positioned to correspond with the one or more apertures 128 of the frame bracket 124. The one or more apertures 118 of the seat bracket 112 and the one or more apertures 128 of the frame bracket 124 are sized to receive a fastening device therethrough to securely fix the seat assembly 100 to the frame member 120. As discussed in greater detail below, the seat assembly 100 is fixedly secured to the frame member 120 upon insertion of a fastener 134 mutually therethrough the one or more apertures 118 of the seat bracket 112 and the one or more apertures 128 of the frame bracket 124. As such, the seat brackets 112 interface with the frame brackets 124 to couple the seat assembly 100 to the frame member 120. Specifically, the pins 114 engage with the bores 130A, 130B to temporarily attach the seat assembly 100 to the frame member 120, and the hooks 116 engage with the upper edge 126 of the frame brackets 124 to temporarily attach the seat assembly 100 to the frame member 120. Further, the fasteners 134 engage with the coupling interfaces formed by the seat bracket 112, specifically the one or more apertures 118, and the frame bracket 124, specifically the one or more apertures 128, to securely fix the seat assembly 100 to the frame member 120 so as to install the seat assembly 100 to the body 12 of the vehicle 10.

Referring to FIGS. 2 and 3, in the present example the frame member 120 includes three frame brackets 124, specifically a pair of outer frame brackets 124 and an intermediate frame bracket 124 positioned between the pair of outer frame brackets 124. The pair of outer bores 130A are positioned adjacent a respective outer frame bracket 124 provided on an outer side of the frame member 120 in the vehicle lateral direction. The pair of inner bores 130B are positioned adjacent the intermediate frame bracket 124.

Referring to FIGS. 1 and 4, an assembly operation of installing the seat assembly 100 to the frame member 120 will now be discussed. During installation of the seat assembly 100 to the body 12 of the vehicle 10, the seat assembly 100 is transitioned to the raised position to facilitate an insertion of the seat assembly 100 through the door opening 19 of the door assembly 18. In other words, due to a size and/or physical profile of the seat assembly 100 in the vehicle longitudinal direction (i.e. in the +/−X direction of the coordinate axes shown in the figures) relative to the door opening 19 when in the use position, receiving the seat assembly 100 through the door assembly 18 and into the rear seat row 16 may be difficult. Accordingly, the seat assembly 100 may be transitioned to the raised position, with the seat cushion 104 pivoted toward the seat back 102 about the pivot axis 106 such that the seat assembly 100 assumes a smaller relative profile in the vehicle longitudinal direction, to thereby permit insertion of the seat assembly 100 through the door opening 19. In this instance, the lower rear end 103 of the seat assembly 100 is aligned with and positioned along the rear region 123 of the frame member 120 that is securely fixed to the body 12 of the vehicle 10 via the one or more flanges 122.

Upon insertion of the seat assembly 100 through the door opening 19, the pins 114 of the pair of seat brackets 112 are aligned with one of the pair of outer bores 130A and are adjacent one of the pair of inner bores 130B. The seat assembly 100 is then lowered such that the pins 114 of the pair of seat brackets 112 are received within the one of the pair of outer bores 130A and the one of the pair of inner bores 130B to engage the pins 114 with the bores 130A, 130B. Specifically, the pin 114 of the seat bracket 112 on an outer side of the seat assembly 100, in the vehicle lateral direction, is initially received within one of the pair of outer bores 130A. As the outer bores 130A are formed as an elongated slot, the engagement of the pin 114 within the outer bore 130A permits the seat assembly 100 to slidably translate within the elongated slot of the outer bore 130A in the vehicle lateral direction (i.e. in the +/−Z direction of the coordinate axes of the figures). The slidable engagement of the pin 114 within the outer bore 130A permits the seat assembly 100 to slidably move with respect to the frame member 120 to facilitate an alignment of the pin 114 on an inner side of the seat assembly 100 with one of the inner bores 130B.

The engagement of the pins 114 within the bores 130A, 130B temporarily attaches the seat assembly 100 to the frame member 120. The temporary attachment of the seat assembly 100 to the frame member 120 inhibits rotation of the seat assembly 100 forward in the vehicle longitudinal direction when the seat cushion 104 is in the raised position due to the engagement of the pins 114 within the bores 130A, 130B of the frame member 120. A further temporary attachment, which inhibits a forward rotation of the seat assembly 100, is provided by an engagement of the hook 116 with the frame bracket 124. Specifically, during alignment of the pins 114 with the bores 130A, 130B, the hook 116 is also aligned with the upper edge 126 of the frame bracket 124. The hook 116 engages with the upper edge 126 of frame bracket 124 such that a portion of the frame bracket 124 adjacent the upper edge 126 is positioned between the rear surface of the base wall 112A of the seat bracket 112 and a front surface of the arm 117.

Accordingly, the upper edge 126 of the frame bracket 124 is configured to engage the hook 116 of the seat bracket 112 to temporarily attach the seat assembly 100 to the frame member 120 to inhibit a forward rotation of the seat assembly 100 in the vehicle longitudinal direction when the seat cushion 104 is in the raised position due to the engagement of the hook 116 and the frame bracket 124.

Still referring to FIG. 4, the engagement of the seat brackets 112 and the frame member 120 inhibits a forward rotation of the seat assembly 100 in a vehicle forward direction (i.e. in the −X direction of the coordinate axes shown in the figures) when the seat cushion 104 remains in the raised position relative to the seat back 102. In particular, the pins 114 of the seat brackets 112 and the bores 130A, 130B of the frame member 120 inhibit a rotation of the seat assembly 100 in a vehicle forward direction (i.e. in the −X direction of the coordinate axes shown in the figures) when the seat cushion 104 is in the raised position relative to the seat back 102 due to at least an engagement of the pins 114 received within the bores 130A, 130B of the frame member 120. Additionally and/or alternatively, the engagement of the upper edge 126 of the frame bracket 124 by the hook 116 of the seat bracket 112 provides further prevention against a rotation of the seat assembly 100 in a vehicle forward direction when the seat cushion 104 is in the raised position relative to the seat back 102 during installation of the seat assembly 100.

Accordingly, the engagement of the pins 114 within the bores 130A, 130B and the engagement of the hooks 116 and the upper edge 126 of the frame brackets 124 temporarily attaches the seat assembly 100 to the body 12 through the frame member 120 prior to the seat assembly 100 being fixedly secured to the body 12 through the frame member 120. As such, upon temporarily attaching the seat assembly 110 to the frame member 120, due to the engagement of the pins 114 within the bores 130A, 130B and the engagement of the hooks 116 and the upper edge 126 of the frame brackets 124, an assembly team member is no longer required to retain the seat assembly 100 against a forward rotation of the seat assembly 100 due to the center of gravity of the seat assembly 100 being forward of the frame member 120 when the seat cushion 104 is in the raised position. Therefore, upon the temporary attachment of the seat assembly 100 to the frame member 120, the assembly team member is permitted to fixedly secure the seat assembly 100 to the body 12 through the frame member 120 without holding the seat assembly 100 in place.

Accordingly, despite the center of gravity of the seat assembly 100 being positioned forward relative to the frame member 120 (i.e. in a vehicle forward direction) during installation of the seat assembly 100 to the vehicle 10, the seat brackets 112, the pins 114, and/or the hooks 116 are configured to temporarily attach the seat cushion 104 and the seat back 102 to the frame member 120 on the floor 20 and inhibit forward rotation of the seat assembly 100 in a vehicle forward direction when in the raised position via the corresponding engagements with the frame brackets 124, the bores 130, and/or the upper edges 126, respectively.

After the seat assembly has been temporarily attached to the frame member 120, the seat assembly 100 is then fixedly secured to the body 12 through the frame member 120 by an engagement of fasteners 134 extending through the apertures 118 formed in the base wall 112A of the seat bracket 112, and apertures 128 formed in the main wall 124A of the frame bracket 124. As briefly described above, the one or more apertures 118 are sized and shaped in accordance with the one or more apertures 128 positioned along the corresponding coupling interface defined by the frame bracket 124 of the frame member 120. Accordingly, a position of the aperture 118 along the seat bracket 112 is in accordance with a position of the aperture 128 along the frame bracket 124 such that the apertures 118, 128 are configured to align with one another when the seat assembly 100 is received along the frame member 120.

It should now be understood that vehicles according to the present disclosure include seat assemblies and frame members for temporarily attaching the seat assemblies to the vehicles and inhibiting rotation of the seat assemblies in a vehicle forward direction prior to fixedly securing the seat assemblies to the vehicles. In embodiments, a seat assembly, for a vehicle having a frame member, includes a seat back, a seat cushion, and a seat bracket. The frame member extends along a floor of the vehicle and includes a bore. The seat cushion is pivotally coupled to the seat back for movement between a use position and a raised position. The seat bracket is coupled to at least one of the seat back and the seat cushion. The seat bracket includes a pin that extends downwardly in a vehicle vertical direction. The pin is configured to engage with the bore to temporarily attach the seat cushion and the seat back to the frame member on the floor of the vehicle and inhibit a rotation of the seat assembly in a vehicle forward direction when the seat cushion is in the raised position due to the engagement of the pin extending through the bore of the frame member.

It is noted that the terms "substantially" and "partially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A seat assembly for a vehicle having a frame member extending along a floor of the vehicle, the frame member including a bore and a second bore, the seat assembly comprising:
   a seat back;
   a seat cushion pivotally coupled to the seat back for movement between a use position and a raised position;
   a seat bracket coupled to at least one of the seat back and the seat cushion, the seat bracket including a pin that extends downwardly in a vehicle vertical direction; and
   a second seat bracket coupled to at least one of the seat back and the seat cushion, the second seat bracket includes a second pin that extends downwardly in the vehicle vertical direction;
   wherein an engagement of the pin within the bore and an engagement of the second pin within the second bore temporarily attaches the seat cushion and the seat back to the frame member on the floor of the vehicle and inhibits rotation of the seat assembly in a vehicle forward direction when the seat cushion is in the raised position due to the engagement of the pin within the bore of the frame member and the engagement of the second pin within the second bore of the frame member.

2. The seat assembly of claim 1, wherein the seat bracket of the seat assembly is disposed within a lower rear end of the seat assembly.

3. The seat assembly of claim 1, wherein the frame member includes a frame bracket having an upper edge, the frame bracket extending upwardly from the frame member, and
   wherein the seat bracket includes a hook extending outwardly from the seat bracket in a vehicle rearward direction, the hook is configured to engage the upper edge of the frame member to temporarily attach the seat cushion and the seat back to the frame member and inhibit rotation of the seat assembly in the vehicle forward direction when the seat cushion is in the raised position.

4. The seat assembly of claim 3, wherein the hook includes a leg and an arm, the leg extending outwardly from the seat bracket in the vehicle rearward direction, and the arm extends downward in the vehicle vertical direction from the leg, wherein the hook engages with the upper edge of the frame bracket such that a portion of the frame bracket adjacent the upper edge is positioned between the arm and the seat bracket.

5. The seat assembly of claim 3, wherein the seat bracket and the frame bracket include corresponding apertures that are configured to receive a fastener therethrough to fixedly secure the seat bracket to the frame member.

6. The seat assembly of claim 1, wherein the bore is an elongated slot extending in a vehicle lateral direction such that upon the engagement of the pin within the elongated slot the seat assembly is slidable in the vehicle lateral direction.

7. The seat assembly of claim 1, wherein the second bore is an elongated slot extending in a vehicle lateral direction such that upon the engagement of the pin within the elongated slot the seat assembly is slidable in the vehicle lateral direction.

8. A vehicle comprising:
a seat assembly including a seat back, a seat cushion, a seat bracket, and a second seat bracket, the seat cushion is pivotable relative to the seat back from a use position to a raised position, the seat bracket includes a pin that extends downwardly in a vehicle vertical direction from the seat bracket, the second seat bracket includes a second pin that extends downwardly in the vehicle vertical direction; and
a frame member that extends along a floor of the vehicle, the frame member includes a bore and a second bore;
wherein an engagement of the pin within the bore and an engagement of the second pin within the second bore temporarily attaches the seat assembly to the frame member on the floor of the vehicle and inhibits rotation of the seat assembly in a vehicle forward direction when the seat cushion is in the raised position due to the engagement of the pin within the bore of the frame member and the engagement of the second pin within the second bore of the frame member.

9. The vehicle of claim 8, wherein the seat bracket of the seat assembly is disposed within a lower rear end of the seat assembly.

10. The seat assembly of claim 8, wherein the frame member includes a frame bracket having an upper edge, the frame bracket extending upwardly from the frame member, and
wherein the seat bracket includes a hook extending outwardly from the seat bracket in a vehicle rearward direction, the hook is configured to engage the upper edge of the frame bracket to temporarily attach the seat cushion and seat back to the frame member and inhibit rotation of the seat assembly in the vehicle forward direction when the seat cushion is in the raised position.

11. The seat assembly of claim 10, wherein the hook includes a leg and an arm, the leg extending outwardly from the seat bracket in the vehicle rearward direction, and the arm extends downward in the vehicle vertical direction from the leg, wherein the hook engages with the upper edge of the frame bracket such a portion of the frame bracket adjacent the upper edge is positioned between the arm and the seat bracket.

12. The seat assembly of claim 10, wherein the seat bracket and the frame bracket include corresponding apertures that are configured to receive a fastener therethrough to fixedly secure the seat bracket to the frame member.

13. The seat assembly of claim 8, wherein the bore is an elongated slot extending in a vehicle lateral direction such that upon the engagement of the pin within the elongated slot the seat assembly is slidable in the vehicle lateral direction.

14. The seat assembly of claim 8, wherein the second bore is an elongated slot extending in a vehicle lateral direction such that upon the engagement of the pin within the elongated slot the seat assembly is slidable in the vehicle lateral direction.

15. A seat assembly for a vehicle having a frame member extending along a floor of the vehicle, the frame member including a bore, the seat assembly comprising:
a seat back;
a seat cushion pivotally coupled to the seat back for movement between a use position and a raised position; and
a seat bracket coupled to at least one of the seat back and the seat cushion, the seat bracket including a pin that extends downwardly in a vehicle vertical direction;
wherein an engagement of the pin within the bore temporarily attaches the seat cushion and the seat back to the frame member on the floor of the vehicle and inhibits rotation of the seat assembly in a vehicle forward direction when the seat cushion is in the raised position due to the engagement of the pin within the bore of the frame member,
wherein the bore is an elongated slot extending in a vehicle lateral direction such that upon the engagement of the pin within the elongated slot the seat assembly is slidable in the vehicle lateral direction.

16. The seat assembly of claim 15, wherein the seat bracket of the seat assembly is disposed within a lower rear end of the seat assembly.

17. The seat assembly of claim 15, wherein the frame member includes a frame bracket having an upper edge, the frame bracket extending upwardly from the frame member, and
wherein the seat bracket includes a hook extending outwardly from the seat bracket in a vehicle rearward direction, the hook is configured to engage the upper edge of the frame member to temporarily attach the seat cushion and the seat back to the frame member and inhibit rotation of the seat assembly in the vehicle forward direction when the seat cushion is in the raised position.

18. The seat assembly of claim 17, wherein the hook includes a leg and an arm, the leg extending outwardly from the seat bracket in the vehicle rearward direction, and the arm extends downward in the vehicle vertical direction from the leg, wherein the hook engages with the upper edge of the frame bracket such that a portion of the frame bracket adjacent the upper edge is positioned between the arm and the seat bracket.

19. The seat assembly of claim 17, wherein the seat bracket and the frame bracket include corresponding apertures that are configured to receive a fastener therethrough to fixedly secure the seat bracket to the frame member.

20. The seat assembly of claim 15, wherein the frame member includes a second bore, and
wherein the seat assembly further comprises a second seat bracket coupled to at least one of the seat back and the seat cushion, the second seat bracket includes a second pin that extends downwardly in the vehicle vertical direction, the second pin configured to engage with the second bore to temporarily attach the seat cushion and the seat back to the frame member on the floor of the vehicle and inhibit rotation of the seat assembly in the vehicle forward direction when the seat cushion is in the raised position due to the engagement of the second pin within the second bore of the frame member,
wherein the second bore is an elongated slot extending in a vehicle lateral direction such that upon the engagement of the pin within the elongated slot the seat assembly is slidable in the vehicle lateral direction.

* * * * *